US012739284B1

(12) United States Patent
Burroughs et al.

(10) Patent No.: US 12,739,284 B1
(45) Date of Patent: Sep. 15, 2026

(54) CLOUD ENVIRONMENT COMPLIANCE AUTOMATION METHODS AND SYSTEMS

(71) Applicant: MERIDIAN KNOWLEDGE SOLUTIONS, LLC, Arlington, VA (US)

(72) Inventors: Adam Burroughs, Arlington, VA (US); Sean Osborne, Arlington, VA (US)

(73) Assignee: MERIDIAN KNOWLEDGE SOLUTIONS, LLC, Arlington, VA (US)

( * ) Notice: Subject to any disclaimer, the term of this patent is extended or adjusted under 35 U.S.C. 154(b) by 0 days.

(21) Appl. No.: 19/552,344

(22) Filed: Feb. 27, 2026

(51) Int. Cl.
*H04L 9/40* (2022.01)
*G06F 9/455* (2018.01)

(52) U.S. Cl.
CPC .......... *H04L 63/20* (2013.01); *G06F 9/45512* (2013.01)

(58) Field of Classification Search
CPC ... H04L 63/20; H04L 63/123; H04L 63/0224; H04L 63/1416; H04L 63/1425; H04L 63/1433; H04L 63/1441; H04L 9/40; H04L 69/22; G06F 9/455; G06F 9/547; G06F 9/45512; G06F 21/566; G06F 21/577; G06N 5/04; G06N 5/022
USPC .............................................................. 726/1
See application file for complete search history.

(56) References Cited

U.S. PATENT DOCUMENTS 11,070,575 B2 * 7/2021 Ravindranath ......... H04L 69/22
11,303,666 B1 * 4/2022 Peters ................. H04L 63/1441
11,943,254 B2 * 3/2024 Thompson .......... H04L 63/1416
12,555,008 B1 * 2/2026 Singh ....................... G06N 5/02
2014/0122873 A1 * 5/2014 Deutsch ............. H04L 63/0884 713/158
2021/0058370 A1 * 2/2021 Adam .................. G06F 21/577
2021/0352099 A1 * 11/2021 Rogers ................ H04L 63/1425
(Continued)

OTHER PUBLICATIONS

Shuqin Zhang, Guangyao Bai, Hong Li, Peipei Liu, Minzhi Zhang, Shujun Li, “Multi-Source Knowledge Reasoning for Data-Driven IoT Security”, MDPI, Sensors 2021, Nov. 15, 2021.
(Continued)

*Primary Examiner* — James N Fiorillo
(74) *Attorney, Agent, or Firm* — Boone IP Law

(57) ABSTRACT

An automated compliance assessment method for a cloud environment includes obtaining compliance framework requirements from declarative framework configurations; executing multi-source validation through command-line interface (CLI) commands for each of a plurality of controls from a control plane of the cloud environment to obtain raw results; selecting service-specific primitive extractors from a plurality of service-specific classes; aggregating the raw results using the service-specific primitive extractors and producing a plurality of normalized compliance facts based on the raw results; correlating the plurality of normalized compliance facts and detecting contradictions amongst the plurality of normalized compliance facts; using compliance outcome judges, evaluating the plurality of normalized compliance facts against the compliance framework requirements, and producing at least one automated attestation based on the evaluating; producing machine-readable output with evidence sources and compliance determinations; and repeating the method continuously at predetermined intervals.

20 Claims, 11 Drawing Sheets

(56) References Cited

U.S. PATENT DOCUMENTS

| | | | | |
|---|---|---|---|---|
| 2022/0150281 | A1* | 5/2022 | Kanungo | G06F 16/9024 |
| 2023/0059526 | A1* | 2/2023 | Parulekar | H04L 63/20 |
| 2023/0177169 | A1* | 6/2023 | Bulut | H04L 9/002 726/1 |
| 2024/0012931 | A1* | 1/2024 | Yannuzzi | H04L 63/107 |
| 2025/0021657 | A1* | 1/2025 | Andriukhin | G06F 21/577 |
| 2025/0211621 | A1* | 6/2025 | Hejl, Jr. | H04L 63/1433 |
| 2025/0233883 | A1* | 7/2025 | Thompson | H04L 9/50 |
| 2025/0278490 | A1* | 9/2025 | Farshteindiker | G06F 21/577 |
| 2025/0294048 | A1* | 9/2025 | Jin | H04L 63/20 |
| 2025/0315509 | A1* | 10/2025 | Wargo | G06F 21/121 |
| 2025/0317466 | A1* | 10/2025 | Fry | H04L 41/16 |
| 2025/0322058 | A1* | 10/2025 | Cross | H04L 63/12 |
| 2025/0358240 | A1* | 11/2025 | Bhat | G06F 8/35 |

OTHER PUBLICATIONS

Xinjian Xiang, Kehan Li, Bingqiang Huang, Ying Cao, "A Multi-Sensor Data-Fusion Method Based on Cloud Model and Improved Evidence Theory", MDPI, Sensors 2022, Aug. 7, 2022.

Syed Imran Akhtar, Abdul Rauf, Muhammad Faisal Amjad, Ifra Batool, "Inter-Cloud Data Security Framework to Build Trust Based on Compliance with Controls", Wiley, IET Information Security, vol. 2024, Article ID 6565102, Dec. 31, 2024.

* cited by examiner

200

| CLI Command | Service | Exemplary Raw Result Fields |
|---|---|---|
| aws ec2 describe-security-groups | EC2 | GroupId, GroupName, IpPermissions[].IpProtocol, IpPermissions[].FromPort, IpPermissions[].IpRanges[].CidrIp |
| aws s3api get-bucket-encryption | S3 | ServerSideEncryptionConfiguration.Rules[].ApplyServerSideEncryptionByDefault.SSEAlgorithm |
| aws rds describe-db-instances | RDS | DBInstanceIdentifier, Engine, StorageEncrypted, PubliclyAccessible, BackupRetentionPeriod, MultiAZ |
| aws cloudtrail describe-trails | CloudTrail | Name, IsLogging, S3BucketName, IsMultiRegionTrail, HasCustomEventSelectors |
| aws iam list-users | IAM | UserName, PasswordLastUsed, CreateDate, MFADevices[] |
| aws kms list-keys | KMS | KeyId, KeyArn, KeyState, KeyUsage |

| Service Type | Primitive Extractor | Validation Domain |
|---|---|---|
| s3, s3api | S3BucketPrimitive | Data protection, encryption, public access, bucket policy |
| iam, sso | IAMPrimitive | Access control, MFA, roles, password policy |
| ec2 | EC2Primitive / SecurityGroupPrimitive | Network security, IMDSv2, public IP exposure |
| rds | RDSPrimitive | Database encryption, public accessibility, backup retention |
| cloudtrail | CloudTrailPrimitive | Audit logging, multi-region trails |
| lambda | LambdaPrimitive | Serverless security, VPC attachment |
| kms | KMSPrimitive | Key management, cryptographic controls |
| backup | BackupPrimitive | Backup plans, recovery capability |
| api_documentation | APIDocumentationPrimitive | API endpoint availability, documentation |
| infrastructure | InfrastructureValidationPrimitive | Log governance infrastructure, audit vault |

| Outcome Judge | Evaluation Domain | Example Controls |
|---|---|---|
| DataExposureOutcome | Data protection: public access, encryption enforcement | KSI-SVC-08 (S3 bucket security) |
| AccessControlOutcome | Authentication: SSO, IAM users, roles, MFA | KSI-IAM-01, KSI-IAM-02, KSI-IAM-03 |
| EncryptionOutcome | Cryptographic controls: encryption at rest | KSI-AFR-11 (UCM policy) |
| NetworkSecurityOutcome | Network controls: security groups, IMDSv2, VPC, subnets, NAT, NACLs | KSI-CNA-01 through KSI-CNA-08 |
| LoggingOutcome | Audit and monitoring: CloudTrail, CloudWatch, log governance | KSI-MLA-01 through KSI-MLA-08 |
| ResilienceOutcome | Backup and recovery: RDS backups, Multi-AZ, backup plans | KSI-CNA-06, KSI-RPL-01 |
| InventoryOutcome | Asset management: resource tracking, tagging, VDP | KSI-PIY-01 through KSI-PIY-08 |
| DocumentationOutcome | Policy compliance: governance documents, baselines | KSI-AFR-07, KSI-CMT-01 |

| Field | Type | Exemplary Value |
|---|---|---|
| ksi_id | string | "KSI-AFR-11" |
| assertion | boolean | true |
| assertion_reason | string | "Excellent (95%): 20 items: 19 verified, 1 confirmed" |
| score | integer | 95 |
| timestamp | ISO 8601 | "2026-02-13T06:00:00Z" |
| resources_scanned | integer | 20 |
| resources_passed | integer | 19 |
| resources_failed | integer | 1 |
| recommended_action | string | "Good compliance. Consider remediating 1 non-compliant resource." |
| commands_executed | integer | 5 |
| successful_commands | integer | 5 |
| evidence_path | string | "evidence_v2/KSI-AFR-11/kms_keys.json" |

Figure 6:
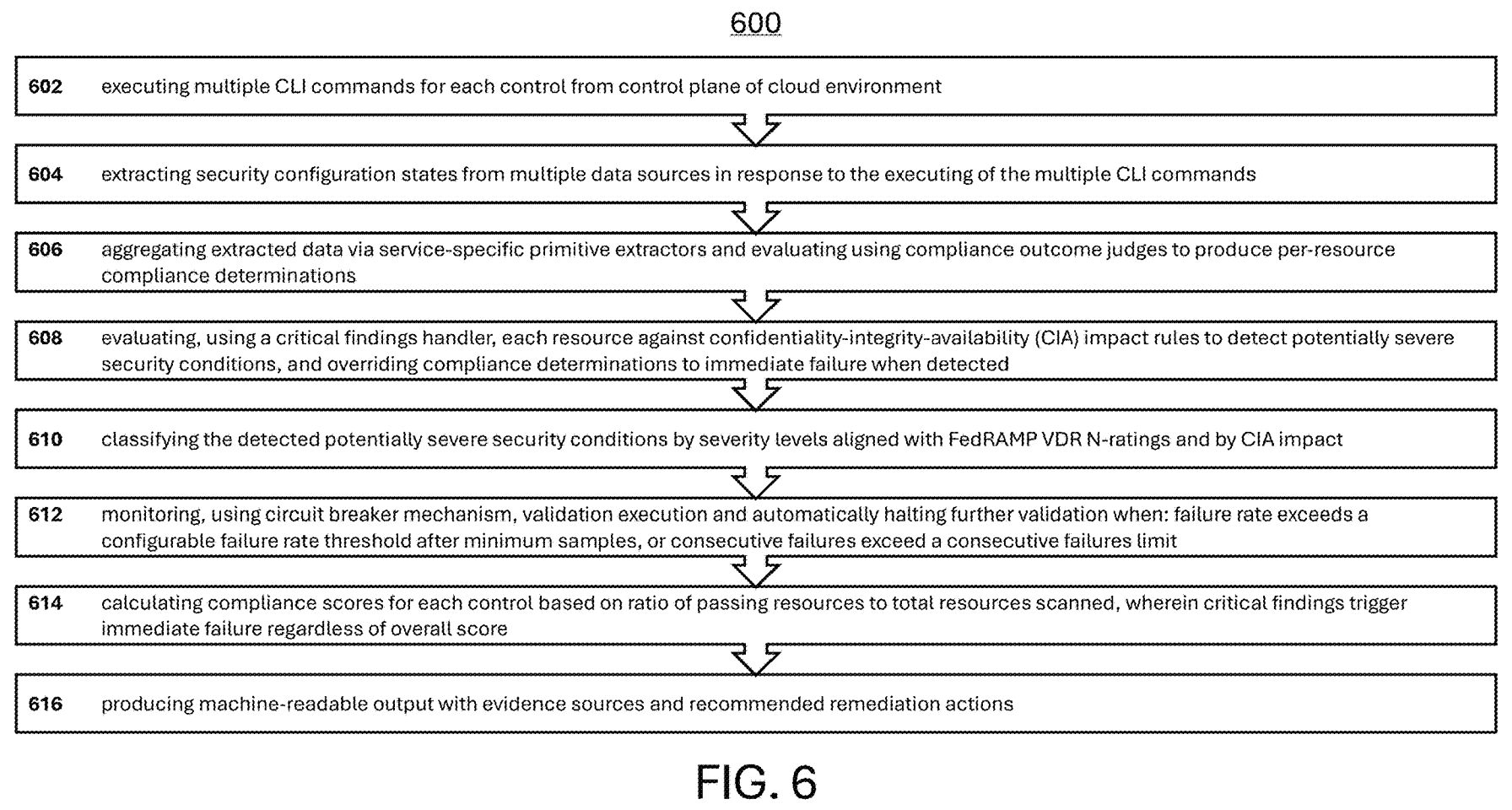

602 executing multiple CLI commands for each control from control plane of cloud environment 604 extracting security configuration states from multiple data sources in response to the executing of the multiple CLI commands 606 aggregating extracted data via service-specific primitive extractors and evaluating using compliance outcome judges to produce per-resource compliance determinations 608 evaluating, using a critical findings handler, each resource against confidentiality-integrity-availability (CIA) impact rules to detect potentially severe security conditions, and overriding compliance determinations to immediate failure when detected 610 classifying the detected potentially severe security conditions by severity levels aligned with FedRAMP VDR N-ratings and by CIA impact 612 monitoring, using circuit breaker mechanism, validation execution and automatically halting further validation when: failure rate exceeds a configurable failure rate threshold after minimum samples, or consecutive failures exceed a consecutive failures limit 614 calculating compliance scores for each control based on ratio of passing resources to total resources scanned, wherein critical findings trigger immediate failure regardless of overall score 616 producing machine-readable output with evidence sources and recommended remediation actions

| Field | Type | Ex. Value 1 | Ex. Value 2 | Description |
|---|---|---|---|---|
| command | string | aws kms list-keys | aws rds describe-db-instances | The CLI command executed |
| status | string | success | failed | Execution outcome |
| exit_code | integer | 0 | 2 | Process exit code |
| execution_time | string | 1.24s | 30s (timeout) | Wall-clock execution duration |
| error_message | string/null | null | "Access Denied" | Error details if failed |

Figure 8:
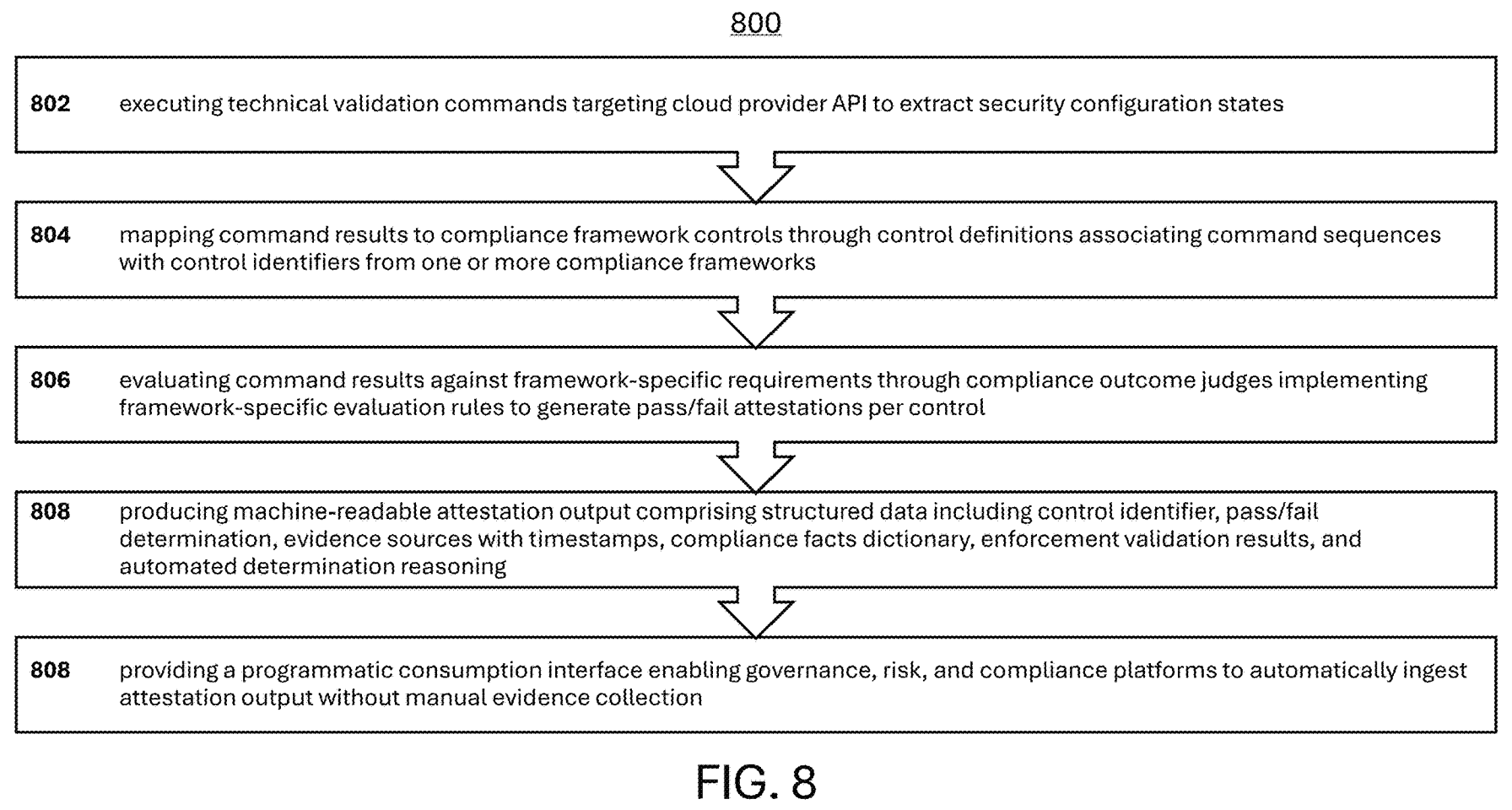

802 executing technical validation commands targeting cloud provider API to extract security configuration states 804 mapping command results to compliance framework controls through control definitions associating command sequences with control identifiers from one or more compliance frameworks 806 evaluating command results against framework-specific requirements through compliance outcome judges implementing framework-specific evaluation rules to generate pass/fail attestations per control 808 producing machine-readable attestation output comprising structured data including control identifier, pass/fail determination, evidence sources with timestamps, compliance facts dictionary, enforcement validation results, and automated determination reasoning 808 providing a programmatic consumption interface enabling governance, risk, and compliance platforms to automatically ingest attestation output without manual evidence collection

| Finding | Severity | CIA | Remediation |
|---|---|---|---|
| Open ingress 0.0.0.0/0 on EC2 port 22 | CRITICAL (N5) | [C, I] | Restrict inbound rules to specific IP ranges; use private subnets behind ALB/NLB |
| RDS PubliclyAccessible: true | CRITICAL (N5) | [C, I] | Set PubliclyAccessible=false; move to private subnet |
| RDS StorageEncrypted: false | HIGH (N4) | [C] | Create encrypted instance and migrate data using KMS CMK |
| S3 bucket without default encryption | HIGH (N4) | [C] | Enable default encryption using SSE-S3 or SSE-KMS |
| CloudTrail logging disabled | CRITICAL (N5) | [I, A] | Enable logging immediately: aws cloudtrail start-logging |
| IAM user without MFA | HIGH (N4) | [C, I] | Enable MFA or migrate to Identity Center with FIDO2/WebAuthn |
| IAM role with Principal: '*' | CRITICAL (N5) | [C, I] | Restrict trust policy to specific accounts/services |
| Insecure TLS (1.0/1.1) on load balancer | HIGH (N4) | [C, I] | Update to ELBSecurityPolicy-TLS-1-2-2017-01 or newer |

| Field | Type | Exemplary Value |
|---|---|---|
| metadata.total_controls | Integer | 61 |
| metadata.pass_rate | Percent | 93.4% |
| metadata.global_status | String | COMPLETED |
| metadata.circuit_breaker_state | String | CLOSED |
| metadata.timestamp | ISO 8601 | 2026-02-21T06:00:00Z |
| metadata.framework | String | FedRAMP KSI v25.12A |
| validations[].control_id | String | KSI-AFR-11 |
| validations[].framework_requirement | String | Ensure cryptographic modules are selected and used in alignment with FedRAMP 20x UCM policy |
| validations[].assertion | Boolean | true |
| validations[].compliance_score | Integer | 95 |
| validations[].status_label | String | Excellent |
| validations[].resources_scanned | Integer | 20 |
| validations[].resources_passed | Integer | 19 |
| validations[].resources_failed | Integer | 1 |
| validations[].evidence_path | String | evidence_v2/KSI-AFR-11/ |
| validations[].command_executions[] | Array | [{command: "aws kms list-keys", status: "success", exit_code: 0, execution_time: "1.24s"}] |
| validations[].recommended_action | String | Remediate 1 non-compliant resource to reach ≥90% |
| critical_findings[].finding | String | Open ingress 0.0.0.0/0 on port 22 |
| critical_findings[].severity | String | CRITICAL |
| critical_findings[].cia_impact | Array | ["C", "I"] |
| critical_findings[].control_id | String | KSI-CNA-01 |
| critical_findings[].framework_requirement | String | Persistently validate that network access controls are properly configured |
| critical_findings[].remediation | String | Restrict ingress to authorized CIDR ranges |

FIG. 10

CLOUD ENVIRONMENT COMPLIANCE AUTOMATION METHODS AND SYSTEMS

TECHNICAL FIELD

The present disclosure relates to cloud environment compliance automation methods and systems.

BACKGROUND

Modern cloud security and compliance involve the following workflow between high-level executive intent (e.g., defined by a Governance, Risk, and Compliance (GRC) framework) and low-level technical execution (e.g., verified and actionable using Cloud Security Posture Management (CSPM)). Abstract mandates (written policies) are first translated into code (as declarative framework configurations). This code targets specific cloud primitives (e.g., storage buckets, compute instances, and application programming interface (API) permissions). The code is then pushed to enforcement processes (enforcement layer or control plane) to physically govern resource behavior (e.g., the configuration and behavior of these primitives). Verification processes monitor the environment for issues, generating actionable insights that notify stakeholders of gaps or failures, to facilitate ongoing alignment with the original governance intent.

For example, a written policy may mandate that "all administrative access must be secured with Multi-Factor Authentication (MFA)." This requirement is converted into a declarative framework configuration using a logic-based language, which explicitly defines that any login attempt lacking a second-factor token must be rejected. The enforcement layer (such as an identity provider) carries out this logic by physically blocking access to users who have not enrolled their devices. A verification process (the CSPM) may continuously verify that no undesired accounts have been created that bypass these rules. If the CSPM identifies such an issue, it produces an actionable insight (e.g., an alert with a recommendation), allowing a security team to disable the account or force MFA enrollment, thereby upholding the original written policy.

Conventional methods and systems lack a suitable bridge between CSPM and GRC. As a result, servicing cloud environments is conventionally a code-intensive endeavor (involving code modification, e.g., extraction or evaluation code), which can be labor intensive and lack automation.

Conventional methods and systems also typically involve point-in-time (at the time of audit) single-command checks, with simplistic compliance assessment, to produce human-readable PDF reports that cannot be used for automation.

Single-source validation querying one service per control in conventional methods and systems can produce false results. For example, a tool might detect that an MFA device exists and report "PASS," failing to detect that the device is a "virtual" (phishing-vulnerable) device, which should be a failure.

Point-in-time assessment creates security gaps. Conventional methods and systems provide quarterly assessments. As a result, data can be 30-60 days stale. A problem arising on Day 1 might not be found until Day 90.

Conventional methods and systems lack contextual risk assessment. Traditional tools only use the Common Vulnerability Scoring System (CVSS). A "CRITICAL" Common Vulnerability/Exposure (CVE) on an isolated, monitored resource may be treated with the same degree of high urgency as one on a public, exposed resource, leading to wasted effort.

Disconnected security operations can lead to erroneous results. Compliance, vulnerability, change, and incident response teams conventionally operate in silos with separate tools. A failed compliance control does not automatically trigger a vulnerability investigation, and a security incident does not trigger a compliance re-validation.

Conventional methods and systems lack machine-readable continuous monitoring. Typically, federal agencies receive manual PDF reports, preventing them from programmatically consuming compliance data for their own automated oversight.

The Federal Risk and Authorization Management Program (FedRAMP) is a US government-wide framework providing a standardized, rigorous approach to security assessment and authorization for cloud products. This program is set to be modernized, per the FedRAMP 20× initiative, by using automation, machine-readable data, and real-time monitoring to significantly reduce the time and cost of authorization, aiming for faster adoption of secure cloud services.

Conventional methods and systems can suffer from high operational costs, labor-intensive and slow processes, may operate on stale data, may lack real-time compliance visibility, e.g., to federal agencies, and are generally ill-suited for FedRAMP 20×.

SUMMARY

An automated compliance assessment method for a cloud environment is disclosed. The method comprises: a) obtaining compliance framework requirements from declarative framework configurations; b) executing multi-source validation through command-line interface (CLI) commands for each of a plurality of controls from a control plane of the cloud environment to obtain raw results; c) selecting service-specific primitive extractors from a plurality of service-specific classes; d) aggregating the raw results using the service-specific primitive extractors and producing a plurality of normalized compliance facts based on the raw results; e) correlating the plurality of normalized compliance facts and detecting contradictions amongst the plurality of normalized compliance facts; f) using compliance outcome judges, evaluating the plurality of normalized compliance facts against the compliance framework requirements, and producing at least one automated attestation based on the evaluating; g) producing machine-readable output with evidence sources and compliance determinations; and h) repeating a) through g) continuously at predetermined intervals.

A method of multi-command validation and critical findings detection for automated compliance assessment of a cloud environment is disclosed. The method comprises: a) executing multiple command-line interface (CLI) commands for each of a plurality of controls from a control plane of the cloud environment; b) extracting security configuration states from multiple data sources in response to the executing of the multiple CLI commands; c) aggregating extracted data via service-specific primitive extractors and evaluating the aggregated extracted data using compliance outcome judges to produce compliance determinations; d) evaluating, using a critical findings handler, each of a plurality of resources of the cloud environment against confidentiality-integrity-availability (CIA) impact rules to detect potentially severe security conditions, and overriding the compliance determinations to immediate failure when the potentially severe security conditions are detected; e) classifying the detected potentially severe security conditions by severity levels and by CIA impact; f) monitoring, using a circuit breaker mechanism, validation execution and automatically halting further validation when failure rate exceeds a configurable failure rate threshold after minimum samples, or when consecutive failures exceed a consecutive failures limit; and g) calculating compliance scores for each of the plurality of controls based on a ratio of passing resources to total resources scanned.

A compliance attestation method providing integration between cloud security scanning outputs and governance, risk, and compliance platform attestation workflows is disclosed. The method comprises: a) executing technical validation commands targeting cloud provider application programming interface (API) to extract security configuration states; b) mapping command results of the technical validation commands to compliance framework controls through control definitions associating command sequences with control identifiers from one or more compliance frameworks; c) evaluating the command results against framework-specific requirements through compliance outcome judges implementing framework-specific evaluation rules to generate pass/fail attestations for each of the controls; d) producing machine-readable attestation output comprising structured data including control identifier from compliance framework, pass/fail determination for each of the controls, evidence sources with executed commands and timestamps, compliance facts dictionary extracted from multiple commands through primitive aggregation, enforcement validation results indicating policy-layer versus enforcement-layer consistency, and automated determination reasoning explaining evaluation logic applied; and e) providing a programmatic consumption interface including control-level attestations mapped to framework requirements with supporting evidence and severity-classified critical findings.

BRIEF DESCRIPTION OF THE DRAWINGS

Other features and advantages disclosed herein will become more apparent from the following detailed description of exemplary embodiments when read in conjunction with the attached drawings.

FIG. 2 is a table illustrating exemplary raw results obtained from command-line input (CLI) commands, according to the present disclosure.

FIG. 3 shows an exemplary primitive factory service-type routing table, according to the present disclosure.

FIG. 4 is a table illustrating exemplary mapping of outcome judges to their evaluation domains and the compliance framework controls they assess, according to the present disclosure.

FIG. 5 shows a table illustrating exemplary machine-readable attestation output fields, according to the present disclosure.

FIG. 6 is a flowchart illustrating an exemplary method of multi-command validation and critical findings detection for automated compliance assessment of a cloud environment according to the present disclosure.

FIG. 7 is a table illustrating exemplary command execution metadata, according to the present disclosure.

FIG. 8 is a flowchart illustrating an exemplary compliance attestation method providing integration between cloud security scanning outputs and governance, risk, and compliance platform attestation workflows according to the present disclosure.

FIG. 9 is a table illustrating exemplary critical findings with CIA impact classification, according to the present disclosure.

FIG. 10 is a table illustrating an exemplary programmatic consumption interface output, according to the present disclosure.

DETAILED DESCRIPTION

Exemplary methods according to the present disclosure can advantageously automate a bridge between cloud security scanning (CSPM) and governance, risk and compliance platforms (GRC) via a primitive-outcome architectural pattern that separates data extraction from compliance evaluation. These methods can execute multi-command technical validation per control, aggregate raw results through service-specific primitive extractors into normalized compliance facts, and apply outcome-based compliance judgment to generate automated attestations.

As noted above, enforcement processes physically govern resource behavior. As such, enforcement-layer logic represents actual security controls actively enforced by the cloud provider control plane at runtime, queryable through direct command-line interface (CLI) interrogation. Exemplary methods according to the present disclosure query actual enforcement state through multiple CLI commands per control (e.g., checking both bucket policy configuration and actual encryption settings). The primitive-outcome architecture normalizes these heterogeneous API responses into consistent facts that outcome judges can evaluate.

In exemplary methods, the automated compliance assessment process follows the following high-level steps: obtain compliance framework requirements from declarative framework configurations; execute multi-source validation through CLI commands per control targeting the cloud provider control plane; use primitive extractors to normalize heterogeneous API responses and correlate facts to detect contradictions; apply compliance outcome judges to evaluate facts against framework requirements and generate automated attestations; produce machine-readable output with evidence sources and compliance determinations, and repeat continuously (e.g., on 4-hour or 6-hour cycles).

In exemplary methods, primitive aggregation by multi-source correlation can provide superior and advantageous accuracy in findings. Moreover, outcome evaluation by automated attestation is technically superior to manual judgment in traditional GRC platforms. Furthermore, continuously monitoring compliance can avoid the stale-data problem in conventional methods and systems.

Exemplary methods advantageously provide architectural separation between data extraction and compliance evaluation (primitive-outcome pattern) through defined class interfaces, implement critical findings detection with confidentiality-integrity-availability (CIA) impact classification for immediate failure on high-severity conditions, include circuit breaker mechanisms for operational safety during validation, generate framework-specific attestation output with control identifiers and evidence mapping, and provide programmatic integration between CSPM and GRC platforms rather than functioning as a standalone tool.

Figure 1:
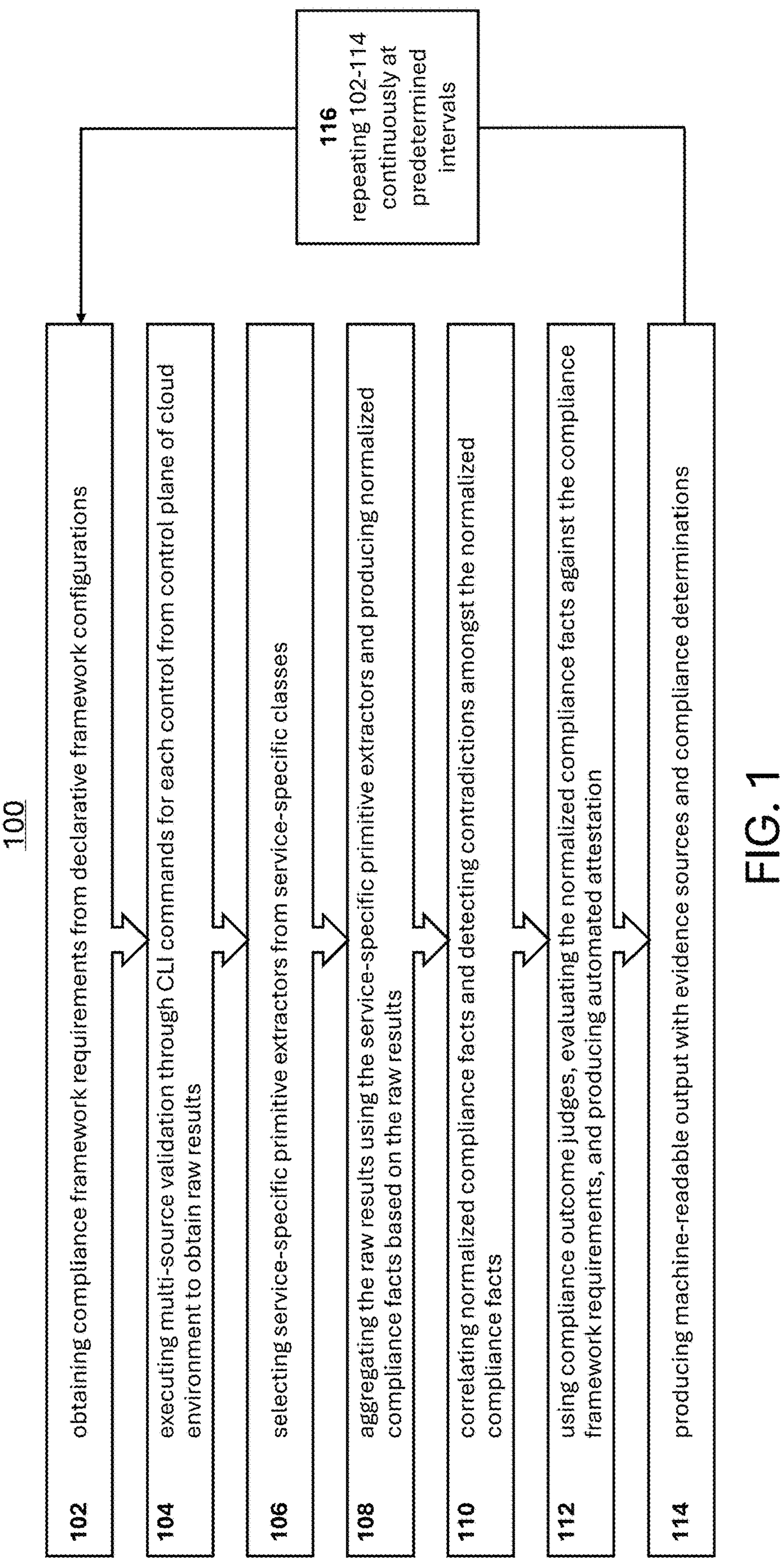
FIG. 1 is a flowchart illustrating an exemplary automated compliance assessment method for a cloud environment according to the present disclosure.

FIG. 1 shows an exemplary automated compliance assessment method 100 for a cloud environment. One or more computer-readable non-transitory storage media may embody software that is operable when executed to perform the method 100. The cloud environment may also be embodied by a computer system.

The method 100 includes, at 102, obtaining compliance framework requirements from declarative framework configurations. This may be accomplished using a compliance framework loader parsing structured control definitions from declarative configuration files, each definition comprising required security configurations, multi-command validation sequences specifying multiple commands per control (e.g., preferably two to one hundred, more preferably two to fifty, more preferably two to twenty, more preferably two to ten commands per control), pass/fail criteria, and evidence source mappings.

The method 100 further includes, at 104, executing multi-source validation through command-line interface (CLI) commands for each of a plurality of controls from a control plane of the cloud environment to obtain raw results. Raw results may include the raw output of the CLI commands. Advantageously, this provides direct and multi-point insight into the enforcement layer of the cloud environment.

Exemplary raw results may include JSON structures, such as: a Reservations object containing EC2 instance configurations with InstanceId, InstanceType, State, SecurityGroups, and MetadataOptions fields; a DBInstances object containing RDS database configurations with DBInstanceIdentifier, Engine, StorageEncrypted, PubliclyAccessible, and BackupRetentionPeriod fields; a trailList object containing CloudTrail configurations with Name, IsLogging, and S3BucketName fields; and a SecurityGroups object containing security group configurations with GroupId, IpPermissions, and IpPermissionsEgress fields. FIG. 2 shows a table 200 illustrating exemplary raw results obtained from command-line input (CLI) commands.

The method 100 further includes, at 106, selecting service-specific primitive extractors from a plurality of service-specific classes.

In exemplary methods, a primitive factory may implement service-type routing to dynamically select primitive extractors from a plurality of service-specific classes including S3BucketPrimitive for data protection validation, IAMPrimitive for access control validation, CloudTrailPrimitive for audit logging validation, EC2Primitive and SecurityGroupPrimitive for network security validation, RDSPrimitive for database security validation, BackupPlanPrimitive for resilience validation, LambdaPrimitive for serverless security validation, CloudWatchPrimitive for monitoring validation, LoadBalancerPrimitive for traffic management validation, and DocumentationPrimitive for policy documentation validation.

In an exemplary implementation involving an engine engine.py, a PrimitiveFactory.create (service_guess, item) function may route by service type; e.g., the routing logic may detect service type from the CLI command structure (e.g., 'aws s3api' routes to S3BucketPrimitive, 'aws iam' routes to IAMPrimitive, 'curl' routes to APIDocumentationPrimitive). FIG. 3 shows an exemplary primitive factory service-type routing table 300.

The method 100 further includes, at 108, aggregating the raw results using the service-specific primitive extractors and producing a plurality of normalized compliance facts based on the raw findings. In an exemplary method, normalization is advantageous because each AWS API may return different JSON structures. Primitives can normalize these into a common dictionary interface where facts are accessed, e.g., via get_fact(key) and has_fact(key), regardless of the source service.

For example, an S3BucketPrimitive extractor may receive raw API responses from a get-bucket-policy command, a get-bucket-encryption command, and a list-objects-v2 command. The extractor parses each response and normalizes the heterogeneous data into a uniform compliance facts dictionary containing: a policy_requires_encryption fact (Boolean, extracted from bucket policy statement analysis), an encryption_enforced fact (Boolean, extracted from server-side encryption configuration), a public_access_blocked fact (Boolean, extracted from public access block settings), an unencrypted_objects_exist fact (Boolean, extracted from object listing headers), and an enforcement_gap fact (Boolean, computed by comparing policy vs. enforcement state, i.e., by detecting that a policy requires encryption but the control plane does not enforce it). This normalization transforms heterogeneous API response formats (varying JSON structures, field names, and nesting depths) into a consistent key-value fact dictionary consumable by outcome judges.

In an exemplary method, normalization is accomplished by transforming heterogeneous API responses with varying JSON structures, field names, and nesting depths into a consistent key-value fact dictionary. For example, an S3 API response containing a nested ServerSideEncryptionConfiguration. Rules array, an RDS API response containing a flat StorageEncrypted boolean field, and a CloudTrail API response containing an IsLogging status field are each transformed by their respective primitive extractors into a uniform dictionary accessed through a common interface (e.g., get_fact accepting a key parameter). This normalization can enable the downstream outcome judges to evaluate compliance without knowledge of the specific API response format of each cloud service.

In an exemplary method, the service-specific primitive extractors request application programming interface (API) responses from the cloud environment. In an exemplary implementation, a BasePrimitive interface is an abstract class specifying: an extract_facts method that parses raw API response data and returns a dictionary of compliance-relevant facts; a get_fact method accepting a key parameter with an optional default value and returning the corresponding fact value; and a has_fact method accepting a key parameter and returning a Boolean indicating whether the fact exists. Each service-specific primitive extractor (e.g., S3BucketPrimitive, IAMPrimitive, CloudTrailPrimitive) inherits from this interface and implements the extract_facts method to parse its specific cloud service API response format into the normalized fact dictionary. For example, that is, the BasePrimitive interface may specify extract_facts( ) returning a dictionary, get_fact (key, default=None), and has_fact (key) returning Boolean.

In an exemplary method 100, twelve or more service-specific primitive extractor classes may be implemented, and eight or more compliance-specific outcome judge classes may be implemented. Additional outcome judges may be added for extended compliance domains.

An exemplary method 100 can thus provide specific compliance insight without editing code (e.g., extraction or evaluation code), and can therefore provide an advantageously portable solution, e.g., by programmatic integration between CSPM tool outputs and GRC platform attestation workflows.

The method 100 further includes, at 110, correlating the plurality of normalized compliance facts and detecting contradictions amongst the plurality of normalized compliance facts.

In exemplary methods, correlating the plurality of normalized compliance facts includes comparing facts from multiple validation layers: a policy layer representing intended security configuration (e.g., a bucket policy requiring encryption), an enforcement layer representing the actual control plane state (e.g., whether server-side encryption is configured), and a runtime layer representing observed behavior (e.g., whether unencrypted objects exist). Detecting contradictions includes identifying enforcement gaps where the policy layer mandates a security control but the enforcement layer does not actively implement it, or where the enforcement layer implements a control but the runtime layer reveals violations. For example, a contradiction is detected when a bucket policy requires encryption (policy layer) but the bucket encryption configuration is absent (enforcement layer), indicating that the policy is not being enforced at the control plane level.

The ability to detect such contradictions is particularly advantageous over conventional methods using single-source validation, which may produce false results. By contrast, using multiple sources of information, the present method can execute multiple related queries per security control and cross-validates the results. For example, a conventional tool might detect that an MFA device exists and report "PASS," failing to detect that the device is a "virtual" (phishing-vulnerable) device, which should be a failure. In contrast, the present method may query for multiple sources of information, such as users, MFA devices, and a credential report, allowing for the determination that devices are "virtual," and thus allowing it to correctly "FAIL" the control.

The method 100 further includes, at 112, using compliance outcome judges, evaluating the plurality of normalized compliance facts against the compliance framework requirements, and producing at least one automated attestation based on the evaluating. One purpose of the above-described correlation may be to determine the focus of the compliance outcome judge(s). For example, the correlated facts, including computed enforcement gap indicators, are passed to the compliance outcome judges via the primitive instance. The compliance outcome judges evaluate these correlated facts as inputs to their framework-specific rules. For example, if the correlation step detected an enforcement gap (where policy requires encryption but enforcement is absent), the outcome judge for data protection receives this enforcement_gap fact and may immediately determine a FAIL status regardless of other facts. The correlation thus provides enriched, cross-validated inputs that enable more accurate compliance determinations than evaluation of individual uncorrelated facts In an exemplary implementation of a compliance outcome judge, a DataExposureOutcome judge receives an S3BucketPrimitive instance and evaluates: whether public access is blocked (from the public_access_blocked fact), whether the resource is in a production environment (from the tags fact), and whether encryption is enforced. If a production resource has public access not blocked, the judge returns a FAIL status with a score of 0 and a remediation recommendation. As another example, a NetworkSecurityOutcome judge evaluates security groups for open ingress (0.0.0.0/0) on sensitive ports (22, 3389), EC2 instances for IMDSv2 enforcement, Lambda functions for VPC attachment, and subnets for private configuration.

In exemplary methods, this may be accomplished using a plurality of compliance outcome judges implementing control-type routing to evaluate extracted facts against framework requirements, e.g., including DataExposureOutcome for data protection validation, AccessControlOutcome for authentication and authorization, LoggingOutcome for audit and monitoring validation, NetworkSecurityOutcome for network controls across security groups, EC2 instances, Lambda functions, subnets, VPC endpoints, NAT gateways, and network ACLs, ResilienceOutcome for backup and disaster recovery, EncryptionOutcome for cryptographic controls, InventoryOutcome for asset management, and DocumentationOutcome for policy compliance. FIG. 4 shows a table 400 providing an exemplary mapping of outcome judges to their evaluation domains and the compliance framework controls they assess, according to the present disclosure.

In a further exemplary embodiment, the compliance framework requirements obtained at 102 further comprise metric profile definitions, each of the metric profile definitions specifying: a boundary classification identifying a control of the plurality of controls as belonging to a boundary; an aggregation strategy; one or more primary metrics each having a threshold and a directionality indicator; and one or more secondary metrics providing contextual data. The evaluating of 112 further comprises aggregating raw data from the compliance outcome judges across all resources for the control, computing aggregate metrics, and evaluating the aggregate metrics against the thresholds defined in the metric profile definition.

For example, each metric profile definition comprises: a control identifier (e.g., KSI-AFR-04); a natural-language compliance question representing the governance inquiry the control is designed to answer (e.g., "How quickly are vulnerabilities being remediated?"); a boundary classification identifying the compliance domain a boundary; an aggregation strategy specifying how raw data points are combined prior to evaluation (e.g., an aggregate-then-evaluate strategy in which raw data is first aggregated into metrics, and the metrics are then evaluated against thresholds); a primary metrics section defining one or more threshold-based metrics each having a description, a numeric threshold, a unit of measurement (e.g., percent, hours, days, USD), and a directionality indicator (higher_is_better, lower_is_better, or equals); and a secondary metrics section defining one or more contextual metrics that provide supporting data without independent pass/fail determination.

A boundary may include, e.g., a machine boundary, a human boundary and/or a financial boundary. A machine boundary may encompass infrastructure and operations controls including vulnerability management (e.g., critical vulnerability SLA compliance within 15 days, high vulnerability SLA compliance within 30 days), pipeline effectiveness (e.g., CI/CD pipeline success rate targeting 95%), backup effectiveness (e.g., backup job success rates by resource type), compute hardening (e.g., IMDSv2 enforcement, VPC attachment for serverless functions), change management (e.g., infrastructure-as-code tracking rate, configuration drift percentage), incident response (e.g., mean time to detect in minutes, mean time to respond in hours), logging and monitoring coverage (e.g., core service enablement, log group counts, retention periods), denial-of-service protection (e.g., WAF web ACL configuration, Shield Advanced enablement), asset inventory (e.g., resource discovery coverage rate, AWS Config recorder status), and SDLC security (e.g., SAST/container/dependency scanning enablement). A human boundary may encompass personnel and identity controls including identity verification (e.g., personnel verification rate, MFA enrollment rate, SSO coverage rate), termination compliance (e.g., access revocation SLA in hours, pending revocation count), and security training (e.g., training completion rate targeting 95%, privileged user training rate). A financial boundary may encompass fiscal controls including budget monitoring (e.g., budget compliance rate, utilization rate, over-budget count) and financial stability (e.g., financial health score, cost anomaly detection, month-over-month cost change percentage, budget forecast variance).

The aggregate-then-evaluate strategy specified by the metric profiles operates differently from the per-resource evaluation. In per-resource evaluation, each individual resource (e.g., each S3 bucket, each EC2 instance) is evaluated independently by the compliance outcome judges, and a compliance score can be calculated from the ratio of passing resources to total resources. In the aggregate-then-evaluate strategy, an aggregator module first collects raw data across all resources for a given control, computes aggregate metrics (e.g., a pipeline success rate across all CI/CD executions, a mean time to respond across all incidents, a backup success rate across all resource types), and then evaluates the computed aggregate metrics against the thresholds defined in the metric profile. This aggregate-first approach enables the system to answer metrics-based compliance questions (e.g., "What is the backup success rate by resource type?") that may not be answered by individual resource pass/fail determinations alone.

For example, a vulnerability management aggregator for control KSI-AFR-04 receives raw scan data and computes: a count of open critical vulnerabilities, the age in days of the oldest critical vulnerability, a count of open high vulnerabilities, the age in days of the oldest high vulnerability, and a 30-day remediation rate. The aggregator then evaluates these computed metrics against the profile thresholds: critical vulnerabilities must be remediated within 15 days (aligned with the FedRAMP VDR critical SLA), high vulnerabilities within 30 days, and the overall remediation rate must meet or exceed 80%. A backup effectiveness aggregator for control KSI-RPL-01 computes per-resource-type success rates (e.g., EC2 backup success rate, RDS backup success rate, EBS backup success rate) and an overall success rate targeting 95%. An incident response aggregator for control KSI-INR-01 computes mean time to detect (MTTD) in minutes targeting 15 minutes, mean time to respond (MTTR) in hours targeting 72 hours, and counts of open and critical incidents.

Advantageously, the metric profile definitions can be declarative configuration files (e.g., YAML format) that can be modified, extended, or replaced without changing the aggregation or evaluation code. Adding a new control requires only defining a new metric profile with thresholds, boundary classification, and aggregation strategy, and providing a corresponding aggregator function. This declarative metric definition parallels the declarative framework configurations described in connection with step 102, and extends the portability of the system to metrics-based compliance regimes that evaluate organizational capabilities (e.g., mean time to respond, backup success rates, training completion rates) rather than individual resource configurations.

The method 100 further includes, at 114, producing machine-readable output with evidence sources and compliance determinations. In exemplary methods, sensitive data (e.g., SecretAccessKey, SessionToken, AccountId, etc.) may be scrubbed from evidence before storage. As such, the method may include sanitizing the machine-readable output by removing credential data, such as sensitive credential data, from evidence sources, prior to storage of the machine-readable output. Additionally, sanitizing evidence before machine-readable output may provide additional security by preventing credential leakage.

In exemplary methods, the compliance outcome judges may each implement an evaluate method accepting a primitive instance and returning a structured result containing status determination, compliance score (0-100 integer), reason string explaining evaluation logic, and optional remediation guidance. For example, the BaseOutcome interface may specify evaluate accepting a primitive instance and returning a structured result containing status determination (PASS, FAIL, WARNING, or ACTIVITY), score (0-100 integer), reason (explanatory string), and evidence (list of supporting command results).

In exemplary methods, a machine-readable attestation output may include a JSON structure, which may include: control_id field containing compliance framework control identifier; attestation field containing status determination; compliance_status field containing COMPLIANT or NON_COMPLIANT status; evidence_sources array containing objects with command, timestamp, and result fields; compliance_facts object containing extracted facts as key-value pairs; enforcement_validation object containing policy_requires, enforcement_actual, and gap_detected fields; automated_determination object containing rule_applied, evaluation_logic, and conclusion fields. FIG. 5 shows a table 400 illustrating exemplary machine-readable attestation output fields.

Exemplary methods 100, by virtue of the architectural separation between data extraction (primitive classes) and compliance evaluation (outcome classes), can advantageously provide compliance determinations and framework updates without code modifications of the cloud environment.

The method 100 further includes, at 116, repeating 102-114 continuously at predetermined intervals. In an exemplary method, the predetermined intervals are every 6 hours. In an exemplary method, "continuously" refers to repeating at predetermined intervals and, optionally, in response to detected infrastructure change events. The predetermined interval may be, but is not limited to, an interval between 1 and 24 hours, more preferably between 1 and 12 hours, more preferably between 4 and 8 hours, more preferably 4 hours or 6 hours. In an exemplary method, the system may additionally execute validation in response to event triggers, such as an infrastructure change detected by a cloud provider event service, providing near-real-time compliance re-assessment. As such, an infrastructure change triggers immediate re-validation).

Example 1: In one example, a computer system was provided implementing an instance of the method 100, by which: 61 FedRAMP Key Security Indicator controls were validated, 12 service-specific primitive extractor classes were implemented, 21 compliance-specific outcome judge classes were implemented, 400+ AWS CLI commands were executed per 4-hour validation cycle, and machine-readable JSON attestation was output. Key Security Indicators (KSI) version 25.12A framework update involved 28 control description modifications and 4 control retirements. Only the configuration file (cli_command_register.json) was modified. Zero lines of code were changed in engine.py or primitive classes or outcome classes. Deployment completed in under 5 minutes. The system immediately validated against updated framework. This demonstrates the advantageous declarative framework portability, in contrast to conventional systems requiring code modification and redeployment for framework updates.

Example 2: In another example, a computer system was provided implementing an instance of the method 100, involving continuous 4-Hour validation cycles; the computer system ran 400+ validations every 4 hours. This provided a 270× improvement in detection speed (4-hour max latency vs. 45-day average) over traditional methods and systems.

Example 3: In another example, a computer system was provided implementing an instance of the method 100, involving six-factor contextual risk assessment. The system automatically analyzed each vulnerability against six environmental factors: Network Reachability, IAM Permissions, Asset Criticality, Attack Path Complexity, Detection Capability, and Mitigation Status. This provided an 80% error reduction in risk assessment versus CVSS-only scoring.

Exemplary methods can further provide a closed-loop integration. A failed compliance check automatically creates a vulnerability detection and response (VDR) entry with a contextual risk classification and calculated timeline. An infrastructure change automatically triggers re-validation. In exemplary methods, a closed-loop integration may be implemented with a remediation engine that reads failed attestation outputs and orchestrates remediation via service-specific remediators (e.g., S3Remediator, CloudTrailRemediator, IAMRemediator, EC2Remediator). For example, IAM remediations may require approval and generate Terraform instead of direct changes.

Exemplary methods can provide machine-readable continuous monitoring. For example, structured JSON outputs are published via public APIs, updated every 4 hours or other suitable interval. This can allow federal agencies to programmatically consume the data for their own information security continuous monitoring (ISCM) dashboards. For example, a control definition for cryptographic module validation (KSI-AFR-11) may specify: a description ('Ensure that cryptographic modules are selected and used in alignment with the FedRAMP 20×UCM policy'), a justification, and an array of five CLI commands including: (1) 'aws kms list-keys' for key management validation, (2) 'aws s3api get-bucket-encryption' for storage encryption-at-rest validation, (3) 'aws rds describe-db-instances' for database encryption-at-rest validation, (4) 'aws elbv2 describe-listeners' for data-in-transit TLS validation, and (5) a CodeCommit get-file command for governance policy document validation. Each command includes a descriptive note identifying its validation purpose.

FIG. 6 shows an exemplary method 600 of multi-command validation and critical findings detection for automated compliance assessment of a cloud environment. One or more computer-readable non-transitory storage media may embody software that is operable when executed to perform the method 600.

The method 600 includes, at 602, executing multiple command-line interface (CLI) commands for each of a plurality of controls from a control plane of the cloud environment. That is, each of a plurality of control definitions specifies multiple CLI commands targeting an API of a provider of the cloud environment. In other words, control definitions can associate CLI command sequences with control identifiers of a control plane of the cloud environment, based on one or more compliance frameworks. In an exemplary method, the one or more compliance frameworks include at least one selected from: FedRAMP Key Security Indicators, NIST 800-53 controls, and ISO 27001 controls. For example, a control definition for cryptographic module validation (KSI-AFR-11) may specify: a description ('Ensure that cryptographic modules are selected and used in alignment with the FedRAMP 20×UCM policy'), a justification, and an array of five CLI commands including: (1) 'aws kms list-keys' for key management validation, (2) 'aws s3api get-bucket-encryption' for storage encryption-at-rest validation, (3) 'aws rds describe-db-instances' for database encryption-at-rest validation, (4) 'aws elbv2 describe-listeners' for data-in-transit TLS validation, and (5) a CodeCommit get-file command for governance policy document validation. Each command includes a descriptive note identifying its validation purpose. In an exemplary implementation, a control definition is a JSON object keyed by control identifier (e.g., 'KSI-AFR-11') containing: description (string), justification (string), cli_commands (array of objects, each with command string, optional service string, note string), and artifact_evidence_paths (array of strings).

The method 600 further includes, at 604, extracting security configuration states from multiple data sources in response to the executing 602 of the multiple CLI commands.

The method 600 further includes, at 606, aggregating extracted data via service-specific primitive extractors and evaluating the aggregated extracted data using compliance outcome judges to produce per-resource compliance determinations. Alternatively to per-resource evaluation, aggregate metrics may be computed from raw data before evaluation. In an exemplary implementation, a VulnerabilityAggregator function computes SLA compliance percentages, and a PipelineAggregator function computes pipeline success rates.

The method 600 further includes, at 608, evaluating, using a critical findings handler, each of a plurality of resources of the cloud environment against CIA impact rules to detect potentially severe security conditions, and overriding the compliance determination to immediate failure when detected. The critical findings handler is a rule-based evaluator that receives individual resource data and applies CIA-impact rules to detect potentially severe security conditions. For each resource evaluated, the handler retrieves applicable rules based on the control identifier being validated, applies each rule to the resource data, and collects any findings. The handler maintains a mapping of control identifiers to lists of rule functions, plus generic rules applied to all resources (e.g., open network ingress detection, encryption-at-rest verification). Each rule function receives the control identifier, service type, and resource data, and returns either no finding or a critical finding object containing severity classification, CIA impact designation, evidence data, and remediation guidance. The handler evaluates each resource individually but maintains a cumulative log of all findings across all resources for summary reporting. For example, the critical findings handler can implement specific rules for detecting CIA-impacting conditions including network exposure, encryption status, authentication requirements, and logging configuration. For example, for each resource evaluated, the method can include applying CIA-impact rules checking for high-severity conditions including open network ingress (0.0.0.0/0) on compute resources (EC2, RDS, Lambda) while allowing on load balancers, publicly accessible databases, unencrypted S3 buckets and RDS instances, disabled CloudTrail logging, missing MFA on IAM users, and overly permissive IAM trust policies with Principal: "*". The method can further include classifying findings by severity (CRITICAL, HIGH, MEDIUM, LOW, INFO) aligned with FedRAMP VDR N-ratings and CIA impact.

In an exemplary implementation, CriticalFindingHandler evaluates individual resources (one resource_data dict at a time). For each resource, it applies a set of rules mapped to the KSI being evaluated. The handler maintains a _rules dictionary mapping KSI identifiers to lists of rule functions. For each resource, it runs all applicable rules plus generic rules (e.g., open CIDR check, RDS encryption check). Each rule returns either None (no finding) or a CriticalFinding object with severity, CIA impact, evidence, and remediation.

In an exemplary method, the potentially severe security conditions include at least one selected from: open network ingress (0.0.0.0/0) on non-load-balancer resources, publicly accessible databases, unencrypted data stores, disabled audit logging, missing multi-factor authentication, and overly permissive Identity and Access Management (IAM) trust policies.

The method 600 further includes, at 610, classifying the detected potentially severe security conditions by severity levels (e.g., aligned with FedRAMP VDR N-ratings) and by CIA impact. That is, classifying can include applying two distinct classifications in parallel: a severity classification and a CIA impact classification. The severity classification assigns one of five severity levels (CRITICAL, HIGH, MEDIUM, LOW, INFO) aligned with FedRAMP VDR N-ratings (N5 through N1, respectively). The CIA impact classification assigns one or more impact categories from confidentiality (C), integrity (I), and availability (A). For example, an open network ingress rule (0.0.0.0/0) on a compute resource may be classified as CRITICAL severity with CIA impact [C, I], while disabled CloudTrail logging may be classified as CRITICAL severity with CIA impact [I, A].

The method 600 further includes, at 612, monitoring, using a circuit breaker mechanism, validation execution and automatically halting further validation when failure rate exceeds a configurable failure rate threshold (e.g., 10% to 80%, preferably 20% to 50%, more preferably 30% by default) after a minimum sample count (e.g., 3 to 50 validations, preferably 5 to 20, more preferably 10 by default), or when consecutive failures exceed a consecutive failures limit (e.g., 2 to 20, preferably 3 to 10, more preferably 5 by default). The circuit breaker mechanism may be selectively enabled or disabled, and supports three operational states: CLOSED (normal operation), OPEN (validation halted), and HALF_OPEN (testing recovery). The circuit breaker can prevent runaway failures from exhausting resources or creating misleading compliance reports. An exemplary method may include defined severity levels aligned with FedRAMP VDR N-ratings, specific threshold configurations, and comprehensive execution logging for audit trails. For example, security group with 0.0.0.0/0 on port 22 triggers CRITICAL finding with CIA impact [C, I]; RDS instance with PubliclyAccessible: true triggers CRITICAL finding; IAM role with Principal: "*" triggers CRITICAL privilege escalation finding.

For example, if a validation cycle begins executing 61 controls and the first 10 controls have been completed with 4 failures (40% failure rate), and the failure rate threshold is configured at 30% with a minimum sample count of 10, the circuit breaker transitions from a CLOSED (operational) state to an OPEN (halted) state upon completing the 10th control. The remaining 51 controls are skipped without execution, their identifiers are logged to a skipped-controls list, and the system global status is set to CIRCUIT_BROKEN. This prevents exhaustion of cloud provider API rate limits, avoids generating misleading compliance data from a potentially misconfigured environment, and preserves forensic information about the failure pattern.

The method 600 further includes recording command execution metadata (e.g., including execution time, exit code, success/failure status, and error messages) for each of the multiple CLI command. In an exemplary method, the command execution metadata enables forensic analysis of validation failures and evidence preservation for compliance audits. For example, if a control for network security (KSI-CNA-01) scans 12 security group resources and finds 10 with status PASS, 1 with status ACTIVITY (verified active with remediation queued), and 1 with status FAIL, the compliance score is calculated as: ((10+1)/12)*100=91.67%, rounded to 91%. Because 91% exceeds the 80% threshold, the control receives a PASS attestation with status label 'Excellent'. However, if a critical finding (e.g., 0.0.0.0/0 ingress on port 22) was detected on any of those resources, the critical findings handler overrides the score to 0% and forces an immediate FAIL regardless of the overall percentage. FIG. 7 shows a table 700 illustrating exemplary command execution metadata.

The method 600 further includes, at 614, calculating compliance scores for each of the plurality of controls based on a ratio of passing resources to total resources scanned. In an exemplary method, critical findings trigger immediate control failure regardless of overall score. In an exemplary method, scores below 80% result in control failure. In exemplary methods, each resource is evaluated against CIA-impact rules and severity classification aligned with FedRAMP VDR N-ratings is applied.

For example, if a control for network security (KSI-CNA-01) scans 12 security group resources and finds 10 with status PASS, 1 with status ACTIVITY (verified active with remediation queued), and 1 with status FAIL, the compliance score is calculated as: ((10+1)/12)*100=91.67%, rounded to 91%. Because 91% exceeds the 80% threshold, the control receives a PASS attestation with status label 'Excellent'. However, if a critical finding (e.g., 0.0.0.0/0 ingress on port 22) was detected on any of those resources, the critical findings handler overrides the score to 0% and forces an immediate FAIL regardless of the overall percentage. In an exemplary implementation, pass_count=sum of findings with status=='PASS'; activity_count=sum of findings with status=='ACTIVITY'; compliance_score=int(((pass_count+activity_count)/len(findings))*100).

In exemplary methods, control failure can produce a machine-readable attestation with an assertion value of FALSE, a status label of 'Insufficient', a compliance score below the threshold, and a recommended remediation action specifying the number of non-compliant resources and target compliance percentage. The failure is reflected in category-level statistics and the overall compliance pass rate. In an exemplary implementation, control failure results in: assertion=False in the JSON output, an assertion_reason string with a FAIL icon and 'Insufficient' label, and a recommended_action string specifying remediation steps and the current vs. target compliance percentage. The control is counted in the failed tally and its category statistics.

The method 600 further includes, at 616, producing machine-readable output with evidence sources, and recommended remediation actions. In exemplary embodiments, the machine-readable output with evidence sources can include machine-readable JSON output with Key Security Indicators (KSI) identifiers, assertion status, score, evidence paths, and command execution logs. For example, the machine-readable output includes the evidence sources as integral fields within the structured JSON output. Specifically, each control attestation object includes: an evidence path field pointing to stored raw evidence artifacts, a command executions array containing execution metadata for each CLI command (including the command string, execution status, exit code, execution time, and any error messages), a count of commands executed, and a count of successful commands. The evidence sources are thus embedded within the attestation output, enabling GRC platforms to access both compliance determinations and supporting evidence from a single machine-readable document.

These methods can facilitate critical findings detection, with circuit breaker mechanisms that can provide operational safety during compliance validation.

FIG. 8 shows an exemplary compliance attestation method 800 providing integration between cloud security scanning outputs and governance, risk, and compliance platform attestation workflows. One or more computer-readable non-transitory storage media may embody software that is operable when executed to perform the method 800.

In exemplary methods, compliance attestation can be automated, CSPM can be bridged to GRC, and manual attestation can be eliminated by virtue of an architectural separation of data extraction and compliance evaluation. Rather than generating mere generic policy results, exemplary methods can generate framework-specific attestation output with control identifiers, evidence sources with timestamps, compliance facts dictionaries, and severity-classified findings formatted for GRC platform consumption.

The method 800 includes, at 802, executing technical validation commands targeting cloud provider application programming interface (API) to extract security configuration states.

The method 800 includes, at 804, mapping command results to compliance framework controls through control definitions associating command sequences with control identifiers from one or more compliance frameworks. In an exemplary method, the one or more compliance frameworks include at least one selected from: FedRAMP Key Security Indicators, NIST 800-53 controls, and ISO 27001 controls.

The method 800 includes, at 806, evaluating the command results against framework-specific requirements through compliance outcome judges implementing framework-specific evaluation rules to generate pass/fail attestations for each of the controls.

The method 800 includes, at 808, producing machine-readable attestation output comprising structured data including control identifier from compliance framework, pass/fail determination for each of the controls, evidence sources with executed commands and timestamps, compliance facts dictionary extracted from multiple commands through primitive aggregation, enforcement validation results indicating policy-layer versus enforcement-layer consistency, and automated determination reasoning explaining evaluation logic applied.

The method 800 includes, at 810, providing a programmatic consumption interface enabling governance, risk, and compliance platforms to automatically ingest attestation output without manual evidence collection, wherein said interface provides control-level attestations mapped to framework requirements with supporting evidence and severity-classified critical findings. FIG. 9 shows a table 900 illustrating exemplary critical findings with CIA impact classification.

FIG. 10 shows a table 1000 illustrating an exemplary programmatic consumption interface output. The table 1000 includes: a metadata section with total controls validated, pass rate, global status, circuit breaker state, timestamp, and compliance framework identifier; a validations array with per-control attestation objects each containing control identifier, the corresponding framework requirement description, assertion Boolean, compliance score, status label, resource counts, evidence path, command execution logs, and recommended remediation action; and a critical findings section with per-finding objects each containing the finding description, severity classification, CIA impact designation, the originating control identifier, the corresponding framework requirement, and remediation guidance.

In exemplary methods, this can provide an advantageous bridge between CSPM and GRC platform through a primitive-outcome architectural pattern that separates data extraction from compliance evaluation.

In exemplary methods, the architectural separation between data extraction and compliance evaluation can enable declarative framework portability. As such, compliance framework updates require only configuration changes, not code modifications. Critical findings detection with CIA impact classification can provide immediate failure on high-severity security conditions regardless of overall compliance score. This continuous monitoring approach can replace, e.g., quarterly audit cycles with automated validation cycles, and the machine-readable output can enable automated federal oversight. This can provide a robust compliance automation system that automatically determines if cloud environments comply with frameworks such as FedRAMP.

Figure 11:
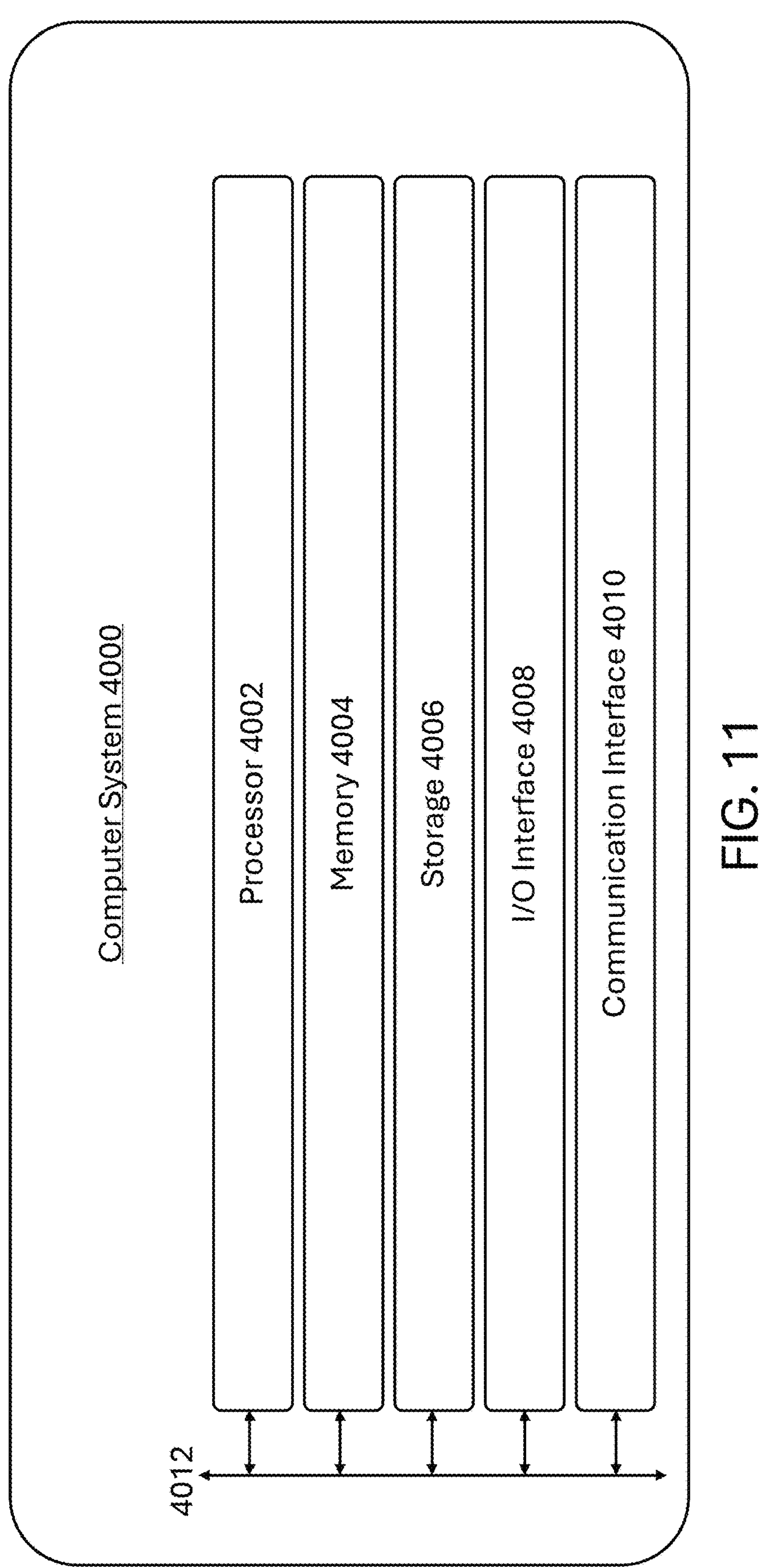
FIG. 11 is a block diagram illustrating a computer system according to the present disclosure.

FIG. 11 illustrates an example computer system 4000. In particular embodiments, one or more computer systems 4000 perform one or more steps of one or more methods described or illustrated herein. In particular embodiments, one or more computer systems 4000 provide functionality described or illustrated herein. In particular embodiments, software running on one or more computer systems 4000 performs one or more steps of one or more methods described or illustrated herein or provides functionality described or illustrated herein. Particular embodiments include one or more portions of one or more computer systems 4000. Herein, reference to a computer system may encompass a computing device, and vice versa, where appropriate. Moreover, reference to a computer system may encompass one or more computer systems, where appropriate.

This disclosure contemplates any suitable number of computer systems 4000. This disclosure contemplates computer system 4000 taking any suitable physical form. As example and not by way of limitation, computer system 4000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 4000 may include one or more computer systems 4000; be unitary or distributed; span multiple locations; span multiple machines; span multiple data centers; or reside in a cloud, which may include one or more cloud components in one or more networks. Where appropriate, one or more computer systems 4000 may perform without substantial spatial or temporal limitation one or more steps of one or more methods described or illustrated herein. As an example and not by way of limitation, one or more computer systems

4000 may perform in real time or in batch mode one or more steps of one or more methods described or illustrated herein. One or more computer systems 4000 may perform at different times or at different locations one or more steps of one or more methods described or illustrated herein, where appropriate.

In particular embodiments, computer system 4000 includes a processor 4002, memory 4004, storage 4006, an input/output (I/O) interface 4008, a communication interface 4010, and a bus 4012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 4002 includes hardware for executing instructions, such as those making up a computer program. As an example and not by way of limitation, to execute instructions, processor 4002 may retrieve (or fetch) the instructions from an internal register, an internal cache, memory 4004, or storage 4006; decode and execute them; and then write one or more results to an internal register, an internal cache, memory 4004, or storage 4006. In particular embodiments, processor 4002 may include one or more internal caches for data, instructions, or addresses. This disclosure contemplates processor 4002 including any suitable number of any suitable internal caches, where appropriate. As an example and not by way of limitation, processor 4002 may include one or more instruction caches, one or more data caches, and one or more translation lookaside buffers (TLBs). Instructions in the instruction caches may be copies of instructions in memory 4004 or storage 4006, and the instruction caches may speed up retrieval of those instructions by processor 4002. Data in the data caches may be copies of data in memory 4004 or storage 4006 for instructions executing at processor 4002 to operate on; the results of previous instructions executed at processor 4002 for access by subsequent instructions executing at processor 4002 or for writing to memory 4004 or storage 4006; or other suitable data. The data caches may speed up read or write operations by processor 4002. The TLBs may speed up virtual-address translation for processor 4002. In particular embodiments, processor 4002 may include one or more internal registers for data, instructions, or addresses. This disclosure contemplates processor 4002 including any suitable number of any suitable internal registers, where appropriate. Where appropriate, processor 4002 may include one or more arithmetic logic units (ALUs); be a multi-core processor; or include one or more processors 4002. Although this disclosure describes and illustrates a particular processor, this disclosure contemplates any suitable processor.

In particular embodiments, memory 4004 includes main memory for storing instructions for processor 4002 to execute or data for processor 4002 to operate on. As an example and not by way of limitation, computer system 4000 may load instructions from storage 4006 or another source (such as, for example, another computer system 4000) to memory 4004. Processor 4002 may then load the instructions from memory 4004 to an internal register or internal cache. To execute the instructions, processor 4002 may retrieve the instructions from the internal register or internal cache and decode them. During or after execution of the instructions, processor 4002 may write one or more results (which may be intermediate or final results) to the internal register or internal cache. Processor 4002 may then write one or more of those results to memory 4004. In particular embodiments, processor 4002 executes only instructions in one or more internal registers or internal caches or in memory 4004 (as opposed to storage 4006 or elsewhere) and operates only on data in one or more internal registers or internal caches or in memory 4004 (as opposed to storage 4006 or elsewhere). One or more memory buses (which may each include an address bus and a data bus) may couple processor 4002 to memory 4004. Bus 4012 may include one or more memory buses, as described below. In particular embodiments, one or more memory management units (MMUs) reside between processor 4002 and memory 4004 and facilitate accesses to memory 4004 requested by processor 4002. In particular embodiments, memory 4004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 4004 may include one or more memories 4004, where appropriate. Although this disclosure describes and illustrates particular memory, this disclosure contemplates any suitable memory.

In particular embodiments, storage 4006 includes mass storage for data or instructions. As an example and not by way of limitation, storage 4006 may include a hard disk drive (HDD), a floppy disk drive, flash memory, an optical disc, a magneto-optical disc, magnetic tape, or a Universal Serial Bus (USB) drive or a combination of two or more of these. Storage 4006 may include removable or non-removable (or fixed) media, where appropriate. Storage 4006 may be internal or external to computer system 4000, where appropriate. In particular embodiments, storage 4006 is non-volatile, solid-state memory. In particular embodiments, storage 4006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 4006 taking any suitable physical form. Storage 4006 may include one or more storage control units facilitating communication between processor 4002 and storage 4006, where appropriate. Where appropriate, storage 4006 may include one or more storages 4006. Although this disclosure describes and illustrates particular storage, this disclosure contemplates any suitable storage.

In particular embodiments, I/O interface 4008 includes hardware, software, or both, providing one or more interfaces for communication between computer system 4000 and one or more I/O devices. Computer system 4000 may include one or more of these I/O devices, where appropriate. One or more of these I/O devices may enable communication between a person and computer system 4000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 4008 for them. Where appropriate, I/O interface 4008 may include one or more device or software drivers enabling processor 4002 to drive one or more of these I/O devices. I/O interface 4008 may include one or more I/O interfaces 4008, where appropriate. Although this disclosure describes and illustrates a particular I/O interface, this disclosure contemplates any suitable I/O interface.

In particular embodiments, communication interface 4010 includes hardware, software, or both providing one or more interfaces for communication (such as, for example, packet-based communication) between computer system 4000 and one or more other computer systems 4000 or one or more networks. As an example and not by way of limitation, communication interface 4010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 4010 for it. As an example and not by way of limitation, computer system 4000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 4000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 4000 may include any suitable communication interface 4010 for any of these networks, where appropriate. Communication interface 4010 may include one or more communication interfaces 4010, where appropriate. Although this disclosure describes and illustrates a particular communication interface, this disclosure contemplates any suitable communication interface.

In particular embodiments, bus 4012 includes hardware, software, or both coupling components of computer system 4000 to each other. As an example and not by way of limitation, bus 4012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 4012 may include one or more buses 4012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Exemplary Embodiments

Further aspects of the disclosure are provided below. Aspects of these exemplary embodiments are largely analogous to the exemplary embodiments, examples, etc. as described above, whereby reference is made to the above for a detailed description.

Item 1. An automated compliance assessment method for a cloud environment, the method comprising:

a) obtaining compliance framework requirements from declarative framework configurations;

b) executing multi-source validation through command-line interface (CLI) commands for each of a plurality of controls from a control plane of the cloud environment to obtain raw results;

c) selecting service-specific primitive extractors from a plurality of service-specific classes;

d) aggregating the raw findings using the service-specific primitive extractors and producing a plurality of normalized compliance facts based on the raw findings;

e) correlating the plurality of normalized compliance facts and detecting contradictions amongst the plurality of normalized compliance facts;

f) using compliance outcome judges, evaluating the plurality of normalized compliance facts against the compliance framework requirements, and producing at least one automated attestation based on the evaluating;

g) producing machine-readable output with evidence sources and compliance determinations; and h) repeating a) through g) continuously at predetermined intervals.

Item 2. The method of item 1, wherein the repeating is triggered when detecting infrastructure change events from the cloud environment.

Item 3. The method of item 1, wherein the correlating comprises comparing facts from at least three validation layers including a policy layer representing intended security configuration, an enforcement layer representing control plane enforcement state, and a runtime layer representing observed runtime behavior, and wherein the detecting of contradictions comprises identifying at least one enforcement gap whereby the policy layer mandates a security control but the enforcement layer does not implement the security control.

Item 4. The method of item 1, wherein the declarative framework configurations further comprise metric profile definitions, each of the metric profile definitions specifying: a boundary classification identifying a control of the plurality of controls as belonging to a boundary; an aggregation strategy; one or more primary metrics each having a threshold and a directionality indicator; and one or more secondary metrics providing contextual data; and wherein the evaluating further comprises aggregating raw data from the compliance outcome judges across all resources for the control, computing aggregate metrics, and evaluating the aggregate metrics against the thresholds defined in the metric profile definition.

Item 5. The method of item 1, wherein the method provides compliance determinations without code modifications of the cloud environment.

Item 6. The method of item 1, wherein the predetermined intervals are every 6 hours.

Item 7. One or more computer-readable non-transitory storage media embodying software that is operable when executed to perform the method of item 1.

Item 8. A method of multi-command validation and critical findings detection for automated compliance assessment of a cloud environment, the method comprising:

a) executing multiple command-line interface (CLI) commands for each of a plurality of controls from a control plane of the cloud environment;

b) extracting security configuration states from multiple data sources in response to the executing of the multiple CLI commands;

c) aggregating extracted data via service-specific primitive extractors and evaluating the aggregated extracted data using compliance outcome judges to produce compliance determinations;

d) evaluating, using a critical findings handler, each of a plurality of resources of the cloud environment against confidentiality-integrity-availability (CIA) impact rules to detect potentially severe security conditions, and overriding the compliance determinations to immediate failure when the potentially severe security conditions are detected;

e) classifying the detected potentially severe security conditions by severity levels and by CIA impact;

f) monitoring, using a circuit breaker mechanism, validation execution and automatically halting further validation when failure rate exceeds a configurable failure rate threshold after minimum samples, or when consecutive failures exceed a consecutive failures limit; and g) calculating compliance scores for each of the plurality of controls based on a ratio of passing resources to total resources scanned.

Item 9. The method of item 8, wherein the multiple CLI commands are two to ten CLI commands.

Item 10. The method of item 8, wherein the potentially severe security conditions include at least one selected from: open network ingress on non-load-balancer resources, publicly accessible databases, unencrypted data stores, disabled audit logging, missing multi-factor authentication, and overly permissive IAM trust policies.

Item 11. The method of item 8, wherein the severity levels are aligned with FedRAMP VDR N-ratings (Critical, High, Medium, Low, Info).

Item 12. The method of item 8, wherein the failure rate threshold has a default value of 30% and the consecutive failures limit has a default value of 5.

Item 13. The method of item 8, wherein the command execution metadata includes execution time, exit code, success/failure status, and error messages.

Item 14. The method of item 8, wherein critical findings trigger immediate control failure regardless of overall score.

Item 15. The method of item 8, wherein, in the calculating, scores below a predetermined failure rate threshold result in control failure.

Item 16. The method of item 8, further comprising producing machine-readable output with evidence sources and recommended remediation actions.

Item 17. The method of item 16, comprising sanitizing the machine-readable output by removing credential data from evidence sources prior to storage of the machine-readable output.

Item 18. One or more computer-readable non-transitory storage media embodying software that is operable when executed to perform the method of item 8.

Item 19. A compliance attestation method providing integration between cloud security scanning outputs and governance, risk, and compliance platform attestation workflows, the method comprising:

a) executing technical validation commands targeting cloud provider application programming interface (API) to extract security configuration states;

b) mapping command results of the technical validation commands to compliance framework controls through control definitions associating command sequences with control identifiers from one or more compliance frameworks;

c) evaluating the command results against framework-specific requirements through compliance outcome judges implementing framework-specific evaluation rules to generate pass/fail attestations for each of the controls;

d) producing machine-readable attestation output comprising structured data including control identifier from compliance framework, pass/fail determination for each of the controls, evidence sources with executed commands and timestamps, compliance facts dictionary extracted from multiple commands through primitive aggregation, enforcement validation results indicating policy-layer versus enforcement-layer consistency, and automated determination reasoning explaining evaluation logic applied; and e) providing a programmatic consumption interface including control-level attestations mapped to framework requirements with supporting evidence and severity-classified critical findings.

Item 20. One or more computer-readable non-transitory storage media embodying software that is operable when executed to perform the method of item 19.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. An automated compliance assessment method for a cloud environment, the method comprising:

a) obtaining compliance framework requirements from declarative framework configurations;

b) executing multi-source validation through command-line interface (CLI) commands for each of a plurality of controls from a control plane of the cloud environment to obtain raw results;

c) selecting service-specific primitive extractors from a plurality of service-specific classes;

d) aggregating the raw results using the service-specific primitive extractors and producing a plurality of normalized compliance facts based on the raw results;

e) correlating the plurality of normalized compliance facts and detecting contradictions amongst the plurality of normalized compliance facts;

f) using compliance outcome judges, evaluating the plurality of normalized compliance facts against the compliance framework requirements, and producing at least one automated attestation based on the evaluating;

g) producing machine-readable output with evidence sources and compliance determinations; and h) repeating a) through g) continuously at predetermined intervals.

2. The method of claim 1, wherein the repeating is triggered when detecting infrastructure change events from the cloud environment.

3. The method of claim 1, wherein the correlating comprises comparing facts from at least three validation layers including a policy layer representing intended security configuration, an enforcement layer representing control plane enforcement state, and a runtime layer representing observed runtime behavior, and wherein the detecting of contradictions comprises identifying at least one enforcement gap whereby the policy layer mandates a security control but the enforcement layer does not implement the security control.

4. The method of claim 1, wherein the declarative framework configurations further comprise metric profile definitions, each of the metric profile definitions specifying: a boundary classification identifying a control of the plurality of controls as belonging to a boundary; an aggregation strategy; one or more primary metrics each having a threshold and a directionality indicator; and one or more secondary metrics providing contextual data; and wherein the evaluating further comprises aggregating raw data from the compliance outcome judges across all resources for the control, computing aggregate metrics, and evaluating the aggregate metrics against the thresholds defined in the metric profile definition.

5. The method of claim 1, wherein the method provides compliance determinations without code modifications of the cloud environment.

6. The method of claim 1, wherein the predetermined intervals are every 6 hours.

7. One or more computer-readable non-transitory storage media embodying software that is operable when executed to perform the method of claim 1.

8. A method of multi-command validation and critical findings detection for automated compliance assessment of a cloud environment, the method comprising:

a) executing multiple command-line interface (CLI) commands for each of a plurality of controls from a control plane of the cloud environment;

b) extracting security configuration states from multiple data sources in response to the executing of the multiple CLI commands;

c) aggregating extracted data via service-specific primitive extractors and evaluating the aggregated extracted data using compliance outcome judges to produce compliance determinations;

d) evaluating, using a critical findings handler, each of a plurality of resources of the cloud environment against confidentiality-integrity-availability (CIA) impact rules to detect potentially severe security conditions, and overriding the compliance determinations to immediate failure when the potentially severe security conditions are detected;

e) classifying the detected potentially severe security conditions by severity levels and by CIA impact;

f) monitoring, using a circuit breaker mechanism, validation execution and automatically halting further validation when failure rate exceeds a configurable failure rate threshold after minimum samples, or when consecutive failures exceed a consecutive failures limit; and g) calculating compliance scores for each of the plurality of controls based on a ratio of passing resources to total resources scanned.

9. The method of claim 8, further comprising producing machine-readable output with evidence sources and recommended remediation actions.

10. The method of claim 9, comprising sanitizing the machine-readable output by removing credential data from evidence sources prior to storage of the machine-readable output.

11. The method of claim 8, wherein the multiple CLI commands are two to ten CLI commands.

12. The method of claim 8, wherein the potentially severe security conditions include at least one selected from: open network ingress on non-load-balancer resources, publicly accessible databases, unencrypted data stores, disabled audit logging, missing multi-factor authentication, and overly permissive IAM trust policies.

13. The method of claim 8, wherein the severity levels include five severity levels.

14. The method of claim 8, wherein the failure rate threshold has a default value of 30% and the consecutive failures limit has a default value of 5.

15. The method of claim 8, wherein the command execution metadata includes execution time, exit code, success/failure status, and error messages.

16. The method of claim 8, wherein critical findings trigger immediate control failure regardless of overall score.

17. The method of claim 8, wherein, in the calculating, scores below a predetermined failure rate threshold result in control failure.

18. One or more computer-readable non-transitory storage media embodying software that is operable when executed to perform the method of claim 8.

19. A compliance attestation method providing integration between cloud security scanning outputs and governance, risk, and compliance platform attestation workflows, the method comprising:

a) executing technical validation commands targeting cloud provider application programming interface (API) to extract security configuration states;

b) mapping command results of the technical validation commands to compliance framework controls through control definitions associating command sequences with control identifiers from one or more compliance frameworks;

c) evaluating the command results against framework-specific requirements through compliance outcome judges implementing framework-specific evaluation rules to generate pass/fail attestations for each of the controls;

d) producing machine-readable attestation output comprising structured data including control identifier from compliance framework, pass/fail determination for each of the controls, evidence sources with executed commands and timestamps, compliance facts dictionary extracted from multiple commands through primitive aggregation, enforcement validation results indicating policy-layer versus enforcement-layer consistency, and automated determination reasoning explaining evaluation logic applied; and e) providing a programmatic consumption interface including control-level attestations mapped to framework requirements with supporting evidence and severity-classified critical findings.

20. One or more computer-readable non-transitory storage media embodying software that is operable when executed to perform the method of claim 19.

* * * * *